United States Patent Office 3,378,341
Patented Apr. 16, 1968

3,378,341
PROCESS FOR THE MANUFACTURE OF POLY-PHOSPHATES OF LOW BULK DENSITY
Gerhard Hartlapp and Waldemar Bielenberg, Hermulheim, near Cologne, Germany, assignors to Knapsack Aktiengesellschaft, Cologne, Germany, a corporation of Germany
No Drawing. Filed Oct. 29, 1963, Ser. No. 319,669
Claims priority, application Germany, Nov. 27, 1962, K 48,306
14 Claims. (Cl. 23—107)

The term "polyphosphates" normally defines compounds of the general formula $$Me^I_{n+2}[P_nO_{3n+1}]$$

in which $Me^I$ is a monovalent metal and $n$ is greater than 1.

The present invention relates to a single-step process for the manufacture of such polyphosphates of low bulk density, and preferably those in which $n \geq 2$ to $n \leq 4$.

It is already known that low-density alkali pyro- and tripoly-phosphates can be produced by a two-step method. In the first step, a solution or molten hydrate of an alkali metal orthophosphate or orthophosphate mixture is sprayed with 1 to 7% of a carbonate decomposing at temperatures of up to 400° C., under conditions which provide initially an orthophosphate calcinate. This orthophosphate calcinate is thereupon converted in the second step, for instance in a rotary kiln, into pyro- and tripolyphosphate by heating it for about 1 hour at temperatures below 450° C. The disadvantages of this process are that it requires two steps, long heating times, and in the case of producing sodium tripolyphosphate, the product is obtained primarily in the low-temperature, or Phase II form, with only a small amount of the high-temperature, or Phase I form.

Other methods are known for producing alkali metal tripolyphosphate, optionally in admixture with alkali pyrophosphates, by spray drying orthophosphate solutions in one step. These methods, however, have the disadvantage that the resultant polyphosphates obtained have high bulk densities, for instance, 0.70 kg./liter. Furthermore, these methods—like the two step methods—result in the production of sodium tripolyphosphate which is predominantly Phase II (low temperature modification).

The present invention unexpectedly provides a single-step process for making polyphosphates of lower bulk density in which an aqueous phosphate solution or suspension is sprayed through a nozzle simultaneously with a solution liberating $CO_2$ during the spray drying, the temperatures of the off-gases being between 280° C. and 450° C. and the spray drying being effected by direct firing with a flame in a known manner. In order to produce alkali metal polyphosphates, the phosphates used as feed are those which have $P_2O_5$ - alkali oxide molar ratios of from 1:2 to 2:3.

As $CO_2$-liberating solutions, there are used, for instance, aqueous solutions of carbonates and/or bicarbonates of the alkali metals and/or of ammonium, these solutions being preferably saturated at room temperature. The $CO_2$-liberating solutions are introduced in such a quantity, with respect to the orthophosphate solutions, that about 0.275 to 11 kg., and preferably 0.55 to 6.5 kg., $CO_2$ is liberated per ton converted $P_2O_5$.

Furthermore, in the production of sodium tripolyphosphate it has been found that the product obtained not only has a low bulk density, but in addition to this, also has a high Phase I content, more than 40% and preferably more than 90%. All previously known methods produce a sodium tripolyphosphate which consists essentially of Phase II.

To produce a sodium tripolyphosphate of low bulk density and high Phase I content, by the process herein, a sodium orthophosphate solution having a molar ratio of $P_2O_5$ to $Na_2O$ of about 3:5 is sprayed through a nozzle, preferably together with an approximately 20% soda ash solution, the temperatures of the off-gases being between 280° C. and 450° C. and preferably between 380° and 430° C., and the spray drying being effected by direct firing with a flame.

Alternatively, it is possible to employ as the starting mixture a sodium orthophosphate solution having a molar ratio of $P_2O_5$ to $Na_2O$ of greater than 3:5 and a quantity of soda ash solution sufficient so that the desired molar ratio of $P_2O_5$:$Na_2O$ of 3:5 is obtained in the end product.

In general, it has proven advantageous to mix the $CO_2$-liberating solution with the phosphate at that point in the process where the phosphate solution is already under the pressure necessary to spray it. A preferred location is a point near the nozzle outlet. This prevents the $CO_2$ from escaping prematurely when the phosphate solution is brought together with the $CO_2$-liberating solution. Instead, it is liberated only within the spray solution and the conversion of the phosphates to the polyphosphates can take place in the presence of $CO_2$.

It has furthermore been found by the present invention, that the quantity of air required for spraying can be considerably reduced.

Example 1

A solution containing 30% $P_2O_5$ and having a $Na_2O$:$P_2O_5$ ratio of 5:3 (3.02 tons of $P_2O_5$ (21.4 moles) and 2.21 tons of $Na_2O$ (35.6 moles)) was sprayed at a rate of 6.5 m.³ of solution per hour in a spray tower in accordance with German Patent 1,018,394, in which the temperature of the off-gases was 350° C. A tripolyphosphate product was obtained in the amount of 5.23 tons/hour. The product was substantially all Phase II (practically free of Phase I) and had a bulk density of 0.7 kg./l. When the off-gas temperature was increased to 420° C., there being no change in the other conditions, a tripolyphosphate product was obtained having a maximum of 30% of Phase I with the balance being Phase II. The bulk density of this product was 0.7 kg./l.

Example 2

A solution containing 30% $P_2O_5$ and having a $Na_2O$:$P_2O_5$ ratio of 5:3.04 (2.187 tons $Na_2O$ and 3.02 tons $P_2O_5$) was sprayed simultaneously with 200 l./hr. of a 20% soda ash solution which was fed under pressure through the nozzle into a spray tower in accordance with German Patent 1,018,394 at a rate of 6.5 m.³ of solution per hour. The off-gases were maintained at a temperature of 350° C.

A tripolyphosphate product was obtained having a 40% Phase I content and a 60% Phase II content and having a bulk density of 0.45 kg./l. When the off-gas temperature of the sprayer was increased to 420° C., the other conditions remaining unchanged, there was obtained a tripolyphosphate product having a 90% Phase I content and a 10% Phase II, and having a bulk density of 0.45 kg./l.

What is claimed is:

1. A one-step spray-drying process for the manufacture of polyphosphates having a bulk density of less than 0.7 kg./liter and defined by the general formula $$Me^I_{n+2}[P_nO_{3n+1}]$$

wherein $Me^I$ is a member selected from the group consisting of alkali metal and ammonium ions, and $n$ is $\geq 2$ to $\leq 4$; comprising jointly spraying into a reaction zone under pressure (a) phosphate solutions and suspensions, respectively; and (b) a solution of material decomposible to form $CO_2$ on being sprayed, the said (a) and (b) material being mixed in the immediate neighborhood of the starting point of the spraying jet.

2. The process of claim 1, wherein the reaction zone is maintained at an elevated temperature and the off-gases have a temperature within the range of about 280 to about 450° C.

3. The process of claim 1, wherein alkali metal orthophosphate solutions containing $P_2O_5$ and alkali metal oxide in the molar ratio of about 1:2 to 2:3 are used as the starting material for making alkali metal polyphosphates.

4. The process of claim 1, wherein a phosphate suspension is utilized in place of a phosphate solution.

5. The process of claim 4, wherein an alkali metal orthophosphate suspension is used.

6. Process for the manufacture of sodium tripolyphosphate having a low bulk density of less than .7 kg./liter and a high Phase I content, wherein an aqueous sodium orthophosphate solution containing $P_2O_5$ and $Na_2O$ in the molar ratio of about 3:5 is sprayed jointly with a sodium carbonate solution, and wherein the off-gases are maintained at a temperature within the range of between about 280 to 450° C., the spraying being effected by direct firing with a flame.

7. The process of claim 6, wherein a sodium orthophosphate solution is used in which the molar ratio of $P_2O_5$ to $Na_2O$ is initially greater than 3:5 and soda ash solution is added in an amount such that the dried end product has a molar ratio of $P_2O_5$ to $Na_2O$ of 3:5.

8. The process of claim 6, wherein an about 20% sodium carbonate solution is used.

9. A one-step spray-drying process for the manufacture of polyphosphates having a bulk density of less than 0.7 kg./liter and defined by the formula $$Me^I_{n+2}[P_nO_{3n+1}]$$

in which $Me^I$ is a member selected from the group consisting of alkali metal and ammonium ions; and $n$ is 2–4;

comprising spraying into a reaction zone jointly and under pressure (a) phosphate solutions and suspensions, respectively, and (b) a solution of material decomposable to form $CO_2$ on being sprayed, the (a) and (b) components being admixed.

10. The process of claim 9 wherein (a) and (b) are mixed in the immediate neighborhood of the starting point of a spraying jet.

11. The process of claim 9 wherein (b) is a solution selected from the group consisting of carbonates and bicarbonates of alkali metals and ammonium.

12. The process of claim 9 wherein (a) and (b) are solutions saturated at ambient temperature.

13. The process of claim 9 wherein (a) and (b) are utilized in a ratio to effect liberation of about 0.275 to 11 kg. $CO_2$ per ton reacted $P_2O_5$.

14. The process of claim 13, wherein about 0.55 to 6.5 kg. $CO_2$ is liberated per ton reacted $P_2O_5$.

References Cited

UNITED STATES PATENTS

| | | | |
|---|---|---|---|
| 2,419,148 | 4/1947 | King | 23—106 |
| 2,747,964 | 5/1956 | Bacon et al. | 23—107 |
| 2,898,189 | 8/1959 | Rodis et al. | 23—107 |
| 2,986,449 | 5/1961 | Rodis et al. | 23—106 |
| 3,023,083 | 2/1962 | Rodis et al. | 23—107 |
| 3,210,154 | 10/1965 | Klein et al. | 23—106 |

FOREIGN PATENTS 515,841  2/1955  Italy.

OSCAR R. VERTIZ, *Primary Examiner.*

MILTON WEISSMAN, *Examiner.*

H. S. MILLER, O. F. CRUTCHFIELD,
*Assistant Examiners.*